United States Patent
Childress

(10) Patent No.: US 11,543,050 B2
(45) Date of Patent: Jan. 3, 2023

(54) TAMPER-RESISTANT OPERATING NUT FOR HYDRANTS

(71) Applicant: Mueller International, LLC, Atlanta, GA (US)

(72) Inventor: Justin Blaine Childress, Albertville, AL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 17/692,966

(22) Filed: Mar. 11, 2022

(65) Prior Publication Data

US 2022/0196182 A1 Jun. 23, 2022

Related U.S. Application Data

(60) Continuation of application No. 17/145,103, filed on Jan. 8, 2021, now Pat. No. 11,300,227, which is a continuation of application No. 16/567,350, filed on Sep. 11, 2019, now Pat. No. 10,920,906, which is a division of application No. 15/852,453, filed on Dec. 22, 2017, now Pat. No. 10,458,568.

(51) Int. Cl.
| | | |
|---|---|---|
| *F16K 35/06* | (2006.01) | |
| *E03B 9/04* | (2006.01) | |
| *F16K 31/50* | (2006.01) | |

(52) U.S. Cl.
CPC ............... *F16K 35/06* (2013.01); *E03B 9/04* (2013.01); *F16K 31/504* (2013.01)

(58) Field of Classification Search
CPC .................................. F16K 35/06; E03B 9/04
See application file for complete search history.

(56) References Cited

U.S. PATENT DOCUMENTS

| | | |
|---|---|---|
| 998,782 A | 7/1911 | Lake |
| 3,532,109 A | 10/1970 | Smith |
| 3,623,498 A | 11/1971 | Manahan et al. |
| 3,935,877 A | 2/1976 | Franceschi |
| 4,062,375 A | 12/1977 | Byrnes |
| 4,139,016 A | 2/1979 | Byrnes |
| 4,356,839 A | 11/1982 | Voynovich |
| 4,936,336 A | 6/1990 | McCauley et al. |
| 4,938,108 A | 7/1990 | Mekler |
| 5,469,724 A | 11/1995 | Pollard |

(Continued)

OTHER PUBLICATIONS

Childress, Justin Blaine; Non-Final Office Action for U.S. Appl. No. 15/852,453, filed Dec. 22, 2017, dated Jan. 24, 2019, 12 pgs.

(Continued)

*Primary Examiner* — Kevin R Barss
(74) *Attorney, Agent, or Firm* — Taylor English Duma LLP

(57) ABSTRACT

A hydrant includes an operating stem comprising a threaded distal end extending from the hydrant; an operating nut comprising a first end facing the hydrant, an opposed second end, and a central bore defined in the operating nut and extending from the first end to the second end, the operating nut positioned on the operating stem such that a portion of the operating stem is positioned in the central bore and the threaded distal end of the operating stem extends beyond the second end of the operating nut; and a shear nut comprising a breakaway portion coupled to a nut portion, the shear nut rotatably secured to the distal end of the operating stem.

20 Claims, 13 Drawing Sheets

(56) References Cited

U.S. PATENT DOCUMENTS

| | | | |
|---|---|---|---|
| 5,622,202 | A | 4/1997 | Etter et al. |
| 5,630,442 | A | 5/1997 | Julicher |
| 5,632,301 | A | 5/1997 | Julicher |
| 5,664,900 | A | 9/1997 | Matthies |
| 5,722,450 | A | 3/1998 | Julicher |
| 5,727,590 | A | 3/1998 | Julicher et al. |
| 6,112,761 | A | 9/2000 | Scotto |
| 6,816,072 | B2 | 11/2004 | Zoratti |
| 6,901,950 | B1 | 6/2005 | Burt et al. |
| 6,994,106 | B1 | 2/2006 | Hackley et al. |
| 9,464,660 | B2 | 10/2016 | Ahdoot et al. |
| 10,458,568 | B2 | 10/2019 | Childress |
| 10,920,906 | B2 | 2/2021 | Childress |
| 11,300,227 | B2 | 4/2022 | Childress |
| 2019/0195388 | A1 | 6/2019 | Childress |
| 2020/0003329 | A1 | 1/2020 | Childress |
| 2021/0131584 | A1 | 5/2021 | Childress |

OTHER PUBLICATIONS

Childress, Justin Blaine; Notice of Allowance for U.S. Appl. No. 15/852,453, filed Dec. 22, 2017, dated Mar. 26, 2019, 7 pgs.
Childress, Justin Blaine; Non-Final Office Action for U.S. Appl. No. 16/567,350, filed Sep. 11, 2019, dated Sep. 14, 2020, 15 pgs.
Childress, Justin Blaine; Notice of Allowance for U.S. Appl. No. 16/567,350, filed Sep. 11, 2019, dated Oct. 22, 2020, 7 pgs.
Childress, Justin Blaine; Non-Final Office Action for U.S. Appl. No. 17/145,103, filed Jan. 8, 2021, dated Sep. 9, 2021, 16 pgs.
Childress, Justin Blaine; Notice of Allowance for U.S. Appl. No. 17/145,103, filed Jan. 8, 2021, dated Dec. 13, 2021, 5 pgs.

TAMPER-RESISTANT OPERATING NUT FOR HYDRANTS

CROSS-REFERENCE TO RELATED APPLICATIONS

This application is a continuation of U.S. application Ser. No. 17/145,103, filed Jan. 8, 2021, which is a continuation of U.S. application Ser. No. 16/567,350, filed Sep. 11, 2019, which issued as U.S. Pat. No. 10,920,906 on Feb. 16, 2021, which is a divisional of U.S. application Ser. No. 15/852,453, filed on Dec. 22, 2017, which issued as U.S. Pat. No. 10,458,568 on Oct. 29, 2019, all of which are hereby incorporated by reference herein in their entireties.

TECHNICAL FIELD

This disclosure relates to hydrants. More specifically, this disclosure relates to tamper-resistant operating nuts for hydrants.

BACKGROUND

A fluid distribution system such as a municipal water system can comprise a hydrant that can permit ready and reliable above-ground access to water by authorized personnel. To turn on water flow through the hydrant, an operating nut positioned on an exterior stem of the hydrant is turned by a wrench to open a water valve inside the hydrant. To discontinue water flowing from the water supply pipe through the hydrant, the operating nut is turned in the opposite direction to close a water valve inside the hydrant.

The operating nut is typically held in place on the stem by a conventional hex nut. Thus, the hex nut and the operating nut can easily be removed by unauthorized users with a conventional wrench or other conventional tools. This can be undesirable in some applications.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a hydrant comprising: an operating stem comprising a threaded distal end extending from the hydrant; an operating nut comprising a first end facing the hydrant, an opposed second end, and a central bore defined in the operating nut and extending from the first end to the second end, the operating nut positioned on the operating stem such that a portion of the stem is positioned in the central bore and the threaded distal end of the stem extends beyond the second end of the operating nut; a snap ring positioned on the stem, the snap ring configured to prevent the operating nut from being removed from the operating stem without removing the snap ring; and a tightening nut rotatably secured to the stem, the tightening nut comprising internal threads configured to matingly engage the threaded distal end of the stem.

Also disclosed is a method of securing an operating nut on an operating stem of a hydrant, the method comprising: placing an operating nut on an operating nut engaging portion of the operating stem that is proximal from the hydrant; placing a snap ring on the stem on a distal portion of the operating stem that is distal from the operating nut engaging portion; and threading a tightening nut on a threaded distal end of the distal portion of the operating stem.

A hydrant is disclosed, the hydrant comprising an operating stem extending from the hydrant, the operating stem defining an elongate stem passage; an operating nut comprising a first end, an opposed second end and a central bore defined in the operating nut and extending from the first end to the second end, the operating nut further defining a dowel bore, the operating stem extending through the central bore, the operating nut positioned such that the dowel bore and the stem passage are substantially co-axially aligned; and a dowel pin inserted through the dowel bore of the operating nut and the stem passage of the operating stem.

Also disclosed is a method of preventing tampering with a hydrant, the method comprising inserting an operation stem of the hydrant through a central bore of an operation nut to mount the operation nut on the operation stem; co-axially aligning a stem passage of the operation stem with a dowel bore of the operation nut; and inserting a dowel pin through the stem passage and the dowel bore to prevent removal of the operation nut from the operation stem and to prevent rotation of the operation nut relative to the operation stem.

Additionally, disclosed is a hydrant comprising an operating stem comprising a threaded distal end extending from the hydrant; an operating nut comprising a first end facing the hydrant, an opposed second end, and a central bore defined in the operating nut and extending from the first end to the second end, the operating nut positioned on the operating stem such that a portion of the operating stem is positioned in the central bore and the threaded distal end of the operating stem extends beyond the second end of the operating nut; and a shear nut comprising a breakaway portion coupled to a nut portion, the shear nut rotatably secured to the distal end of the operating stem.

A method of preventing tampering with a hydrant is disclosed, the method comprising inserting an operating stem of the hydrant through a central bore of an operating nut to mount the operating nut on the operating stem; rotatably threading a shear nut onto a threaded distal end of the operating stem, the shear nut comprising a breakaway portion and a nut portion; and breaking the nut portion away from the breakaway portion to remove the nut portion from the operating stem.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
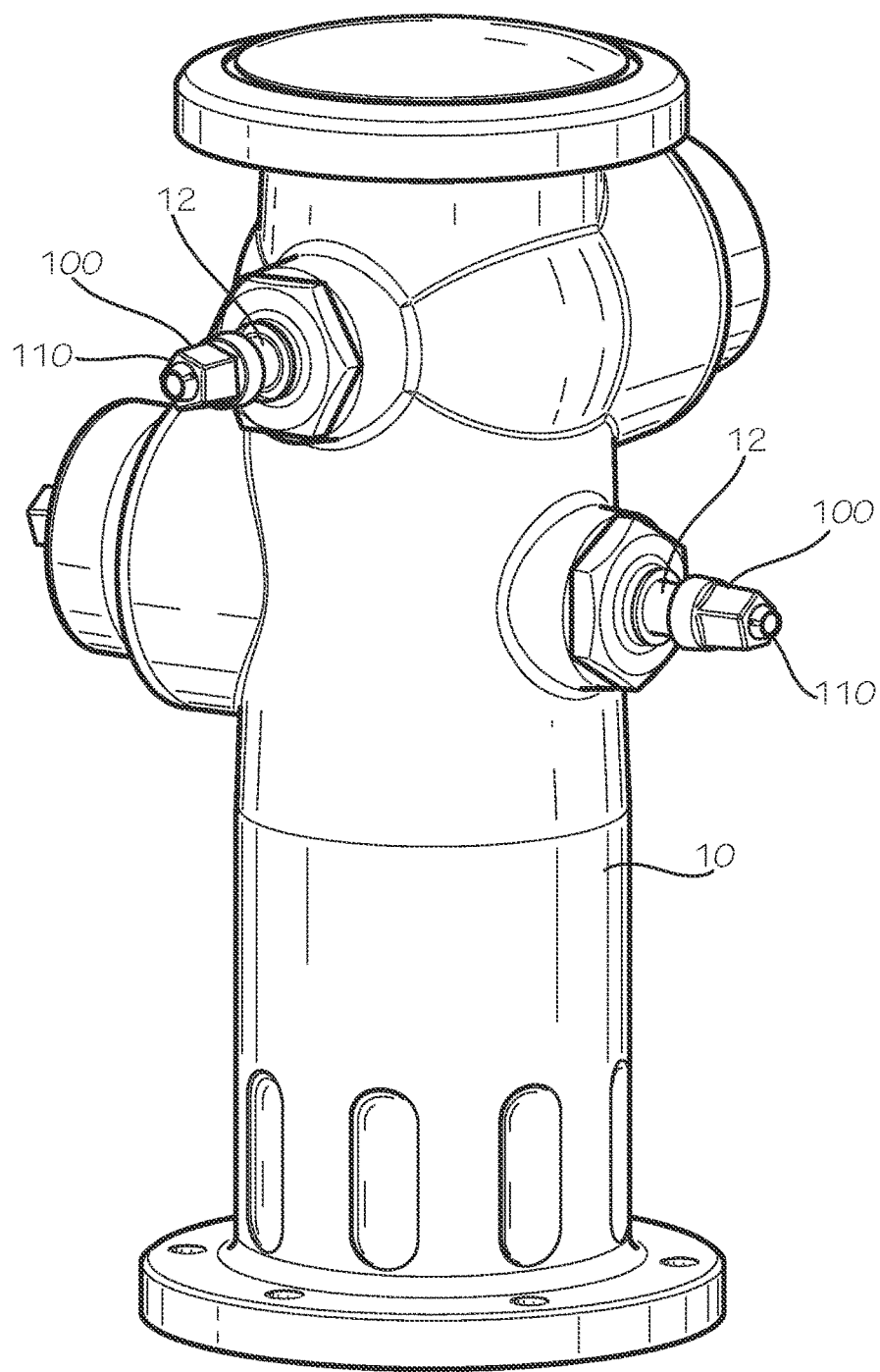
FIG. 1 is a perspective view of a hydrant comprising a tamper-resistant operating nut, in accordance with one aspect of the present disclosure, the hydrant comprising a grooved nut.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed are hydrants comprising one or more tamper-resistant operating nuts and associated methods, systems, devices, and various apparatus. The tamper-resistant operating nuts can be positioned on a stem of a hydrant and securely held in place to prevent undesirable or unauthorized removal of the operating nut. It would be understood by one of skill in the art that the disclosed tamper-resistant operating nuts are described in but a few exemplary embodiments among many. No particular terminology or description should be considered limiting on the disclosure or the scope of any claims issuing therefrom.

Figure 2:
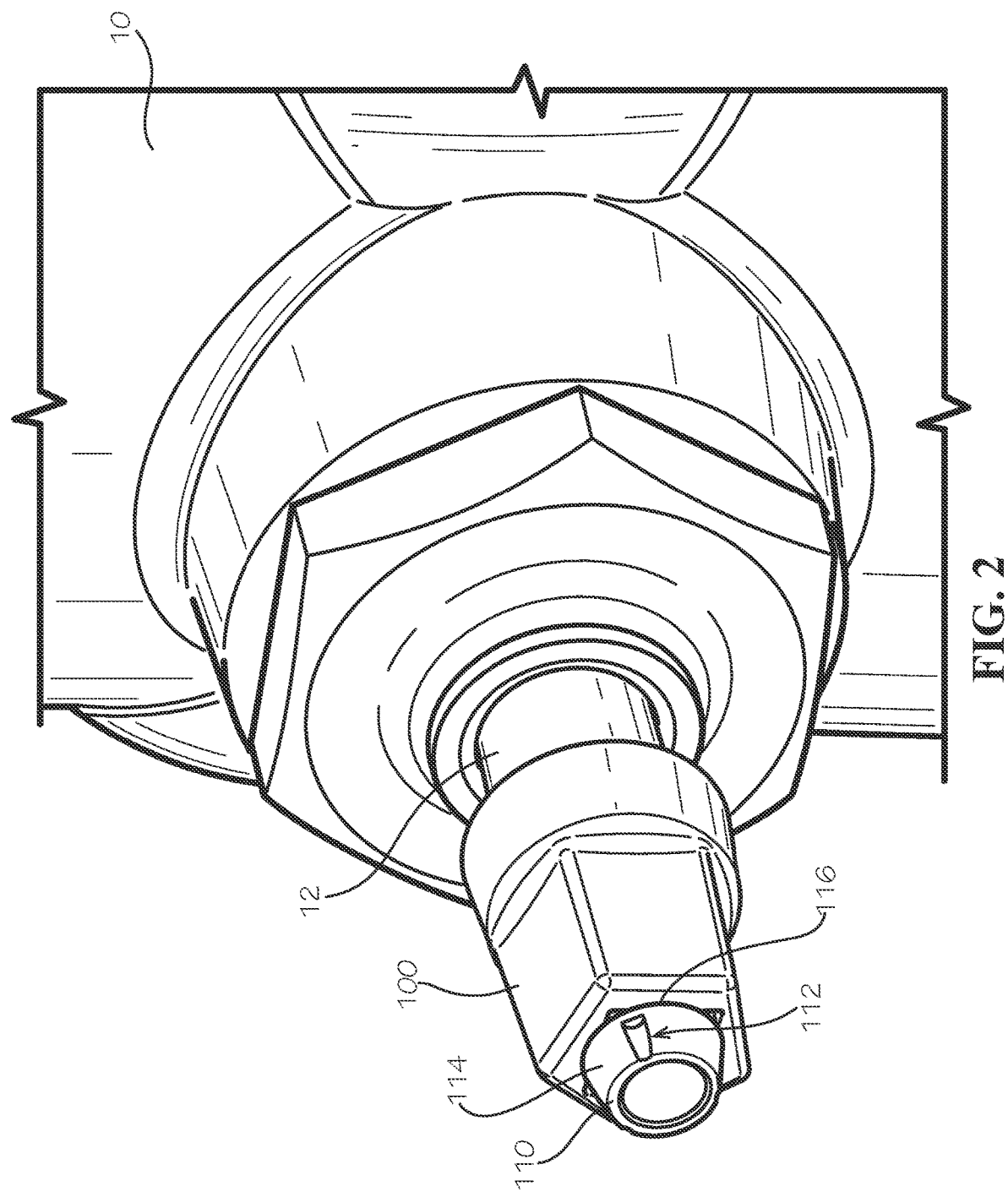
FIG. 2 is a magnified perspective view of a portion of the hydrant of FIG. 1.
Figure 3:
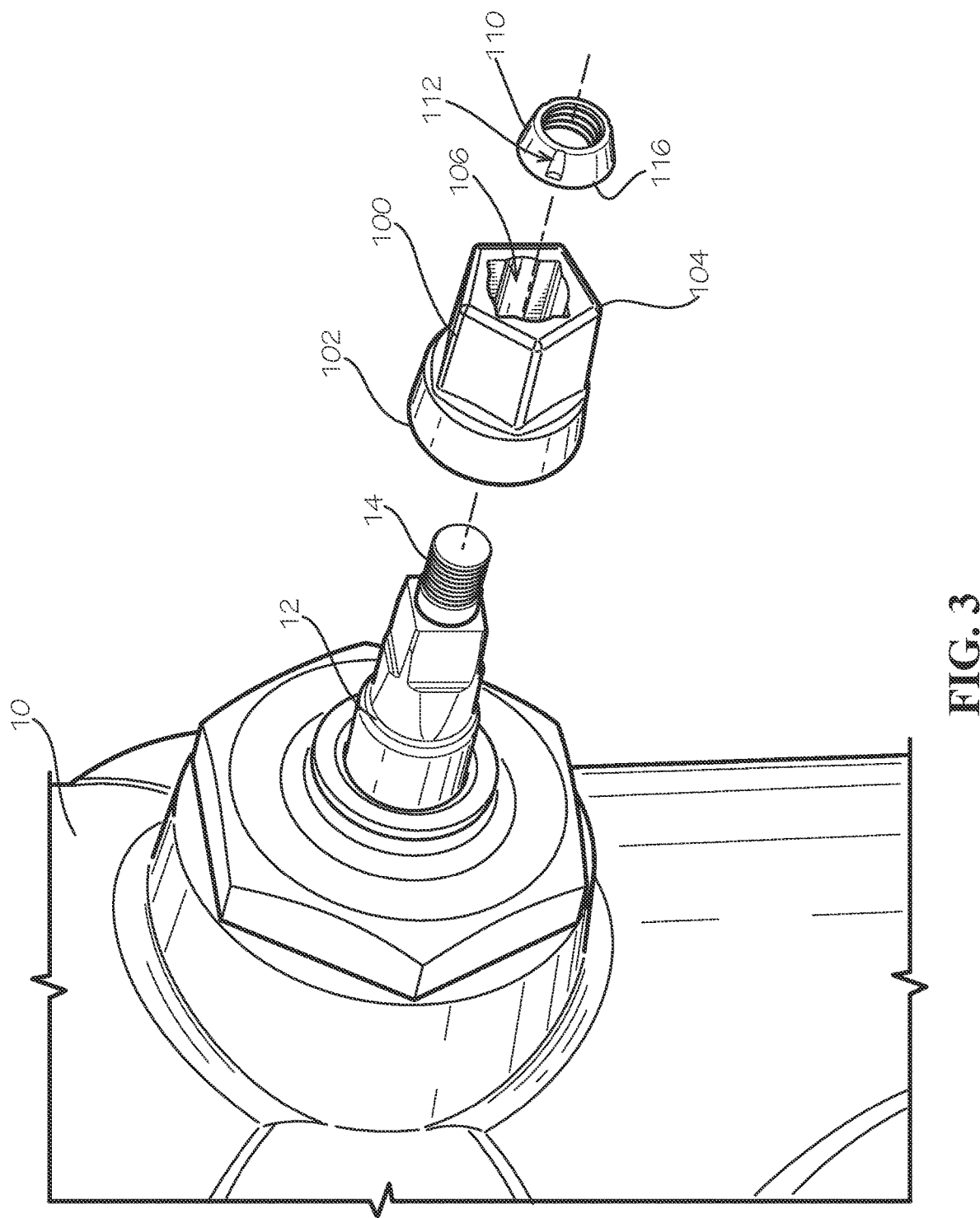
FIG. 3 is an exploded perspective view of the hydrant of FIG. 1.

FIGS. 1-3 show a hydrant 10 comprising two a tamper-resistant operating nuts, the hydrant 10 comprising two operating nuts 100 and two frustoconical grooved nuts 110, according to one aspect. Any number of tamper-resistant operating nuts can be present in various aspects, depending typically on the number of operating nuts that a particular hydrant comprises. As shown in FIG. 3, an operating stem 12 comprising a threaded distal end 14 can extend from the hydrant 10. The operating nut 100 can comprise a first end 102 and an opposed second end 104. A central bore 106 can be defined in the operating nut 100 and can extend from the first end 102 to the second end 104 of the operating nut 100. The operating nut 100 can be positioned on the stem 12 of the hydrant 10 such that the first end 102 of the operating nut 100 faces the hydrant 10, a portion of the stem 12 is positioned in the central bore 106, and the threaded distal end 14 of the stem 12 extends beyond the second end 104 of the operating nut 100.

As shown in FIG. 2, the grooved nut 110 can be a frustoconical nut defining a plurality of indentions 112 defined in an outer surface 114 of the grooved nut 110. For example, the grooved nut can be a tri-grooved nut defining three indentions 112 defined in the outer surface 114 of the grooved nut 110. Internal threads can be defined in the grooved nut 110 and configured to matingly engage the threaded distal end 14 of the stem 12. Specialized tools configured to matingly engage the indentions 112, such as tri-groove wrenches, tri-groove sockets and the like can be used to drive the grooved nut 110. Thus, conventional tools such as wrenches, pliers and sockets having planar jaws and/or planar faces cannot be used to remove the grooved nut 110, because the planar jaws and/or planar faces cannot engage the indentions 112 of the grooved nut 110.

In use, the grooved nut 110 can be threaded onto the distal end 14 of the stem 12 and securely attached to the stem 12 with a mating grooved wrench, such as a tri-groove socket and the like. In one aspect, the grooved nut 110 can be threaded onto the stem 12 until a proximal end 116 of the grooved nut 110 is adjacent to the second end 104 of the operating nut 100. Because specialized mating tools, such as tri-groove wrenches, tri-groove sockets, and the like are not common tools, unauthorized removal of the grooved nut 110 from the stem 12 can be difficult.

In use, the grooved nut 110 can insure that the operating nut 100 is in place on the hydrant 10. Rotation of the operating nut 100 in a first direction can open a valve in the hydrant 10 so that water can pass through the hydrant 10. Rotation of the operating nut 100 in a second direction that is opposed to the first direction can close the valve and discontinue the flow of water through the hydrant 10.

While reference is made to grooved nuts 110, other nuts and fastening devices that require the use of specialized tools to install and remove the nuts are also contemplated.

Figure 4:
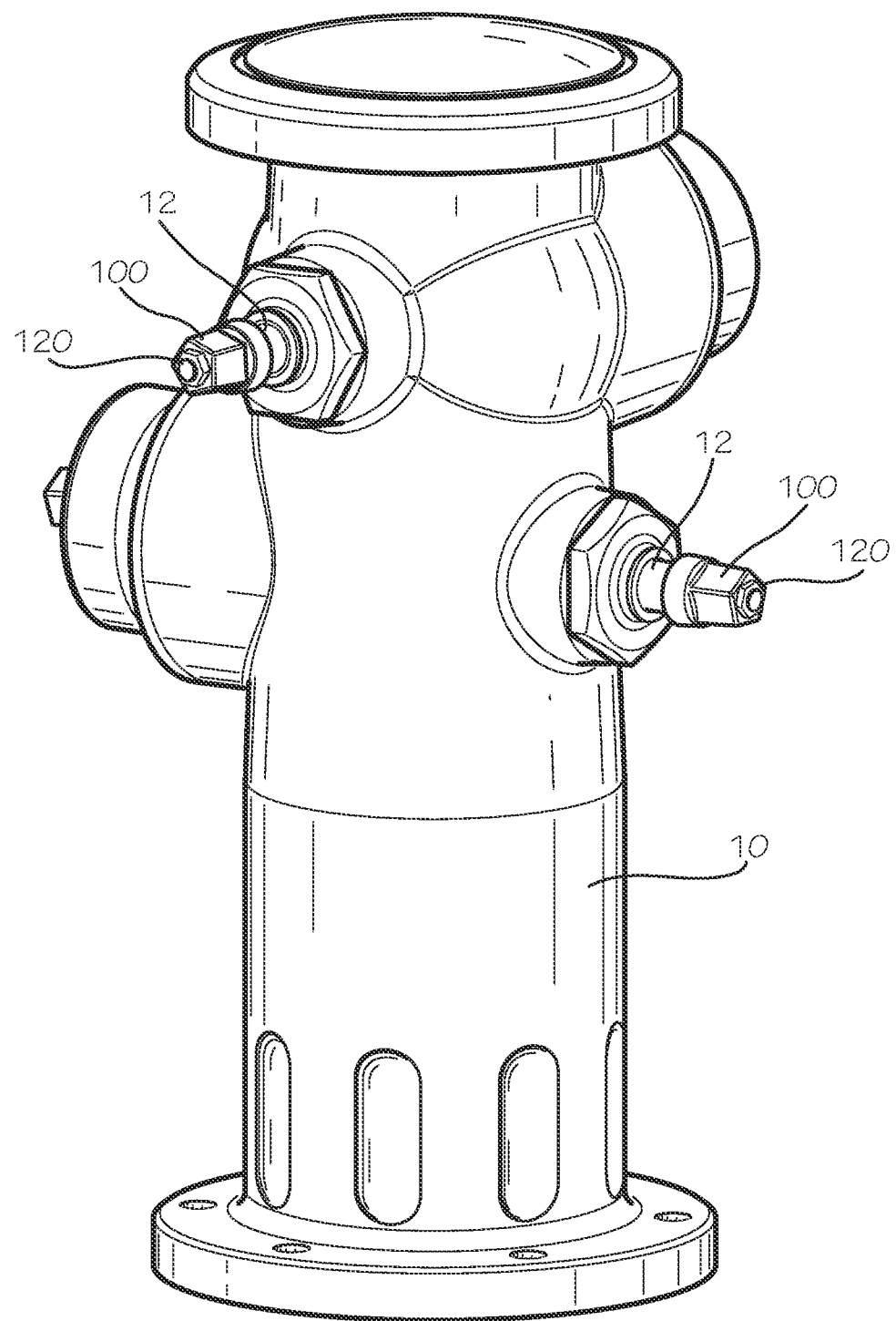
FIG. 4 is a perspective view of a hydrant comprising a tamper-resistant operating nut, in accordance with one aspect of the present disclosure, the hydrant comprising a snap ring and a tightening nut.
Figure 5:
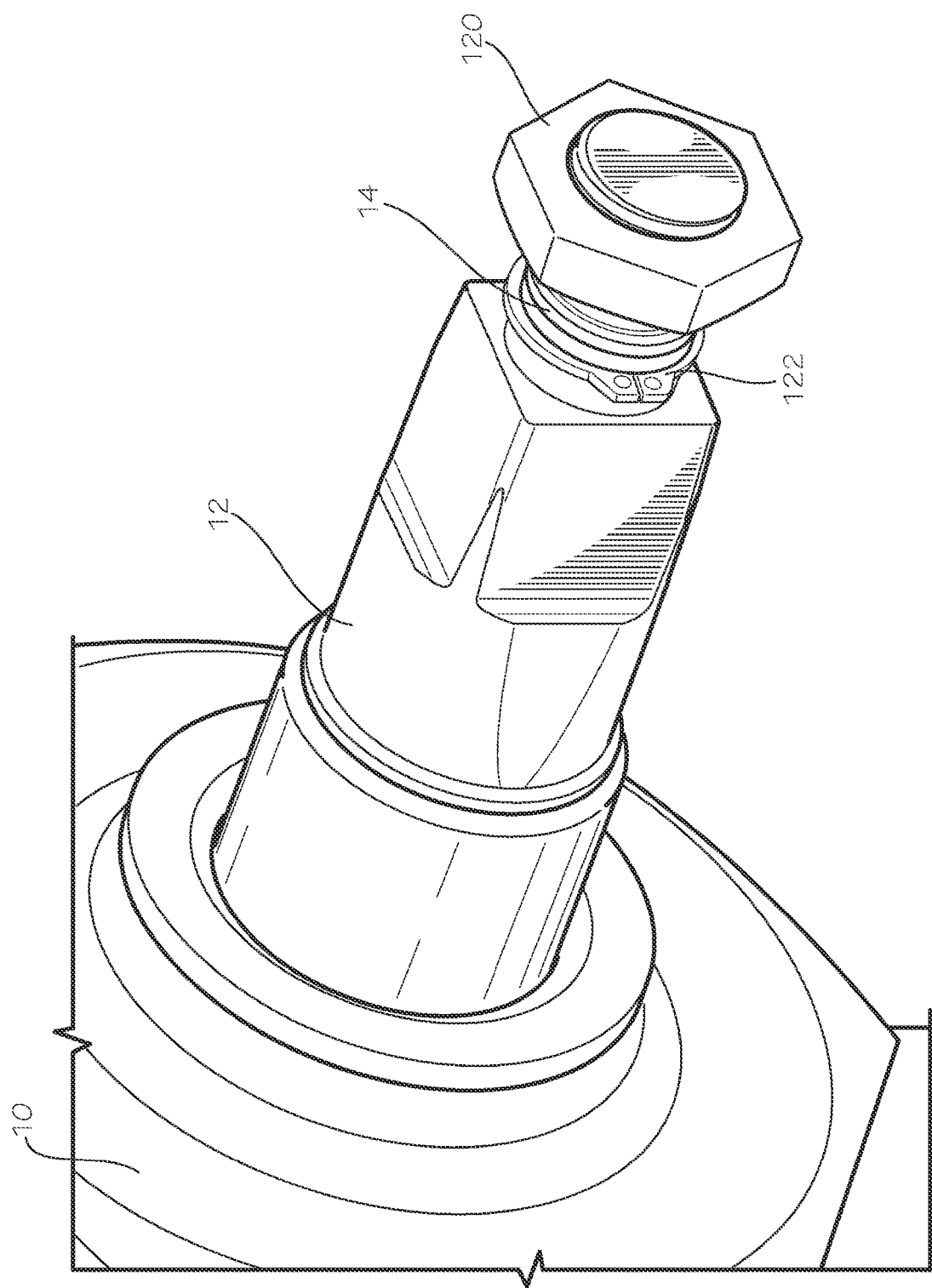
FIG. 5 is a magnified perspective view of a portion of the hydrant of FIG. 4, in which the operating nut is not shown for clarity.
Figure 6:
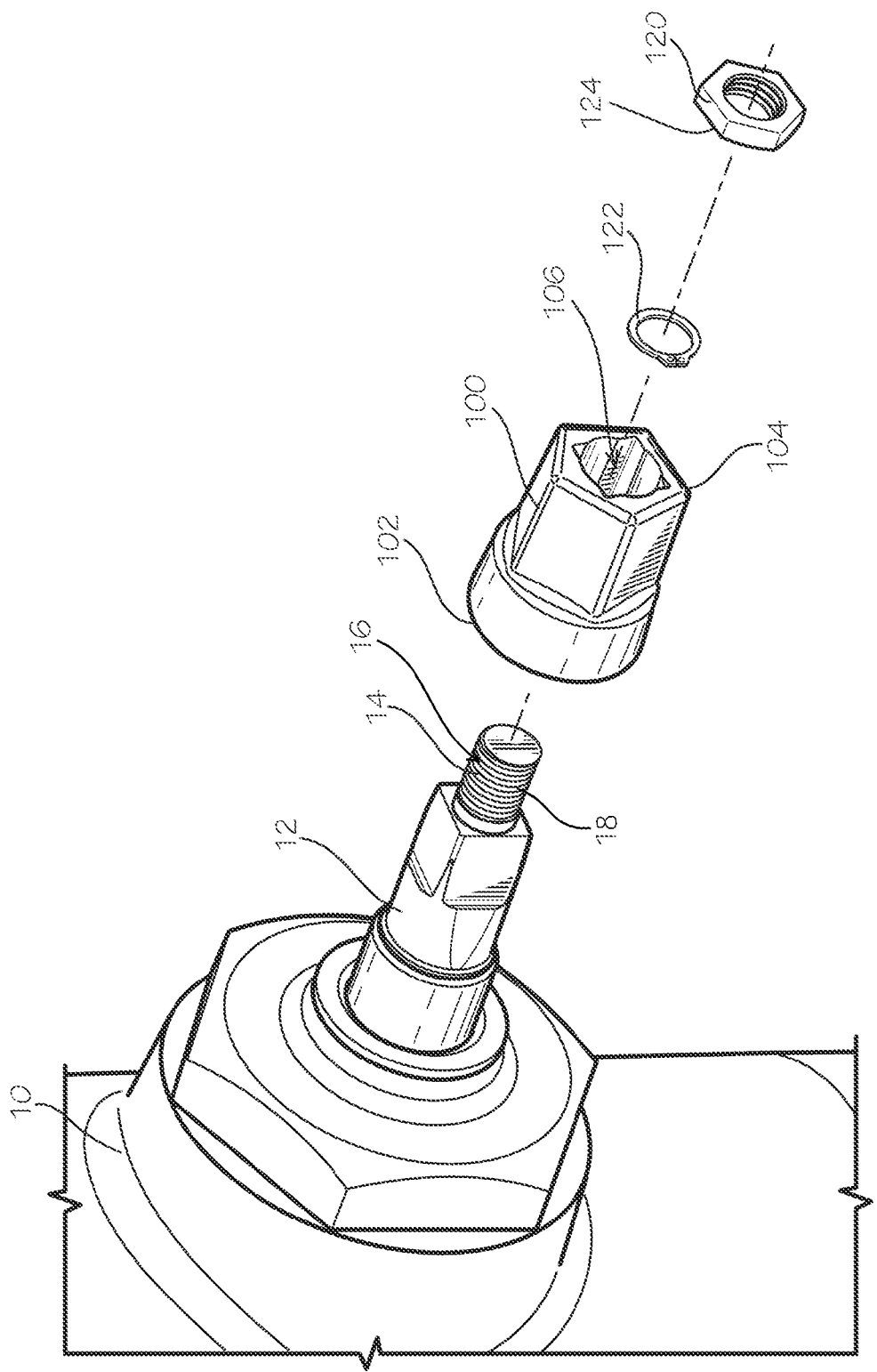
FIG. 6 is an exploded perspective view of the hydrant of FIG. 4.
Figure 7:
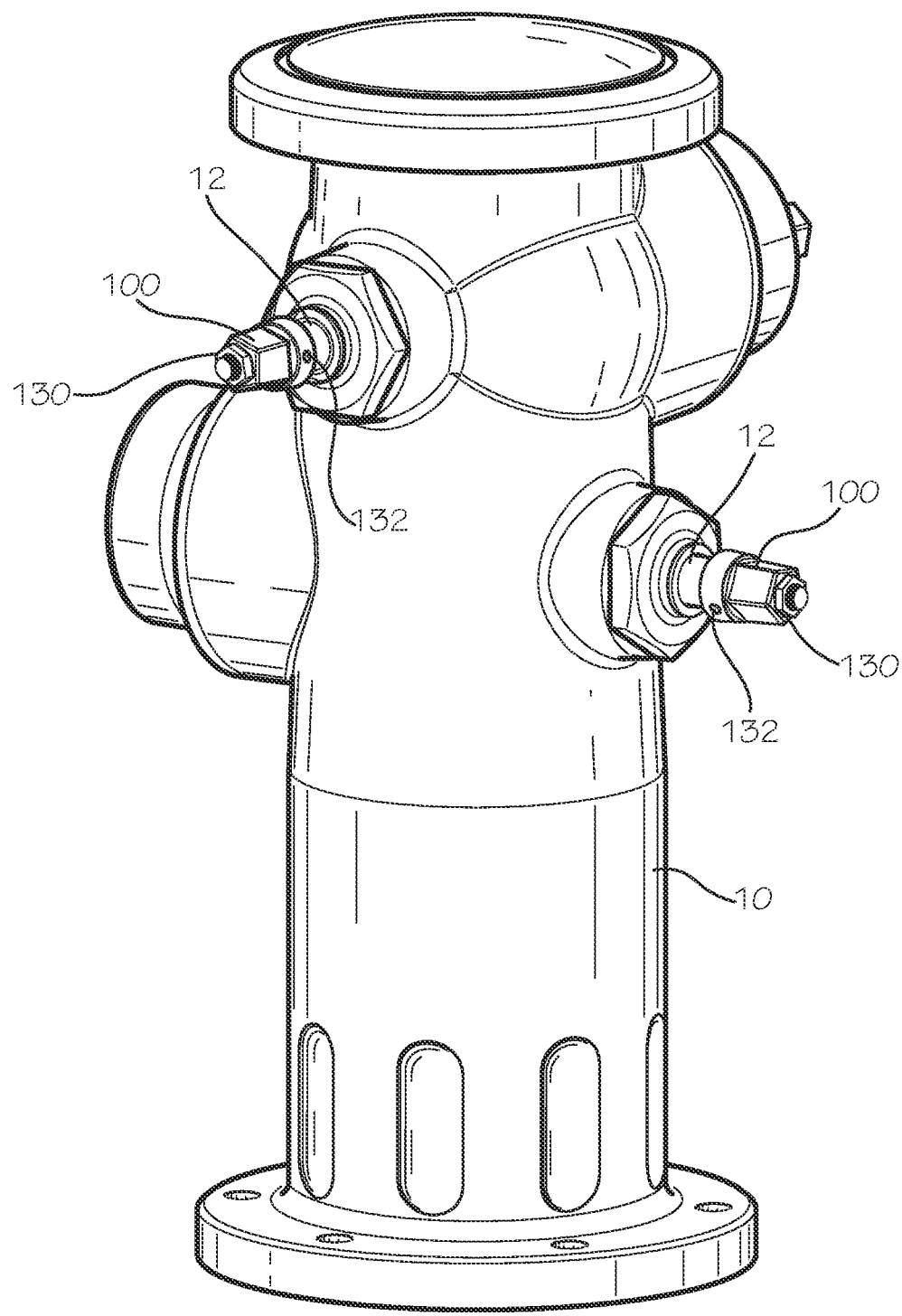
FIG. 7 is a perspective view of a hydrant comprising a tamper-resistant operating nut, in accordance with one aspect of the present disclosure, the hydrant comprising a dowel pin and a tightening nut.
Figure 8:
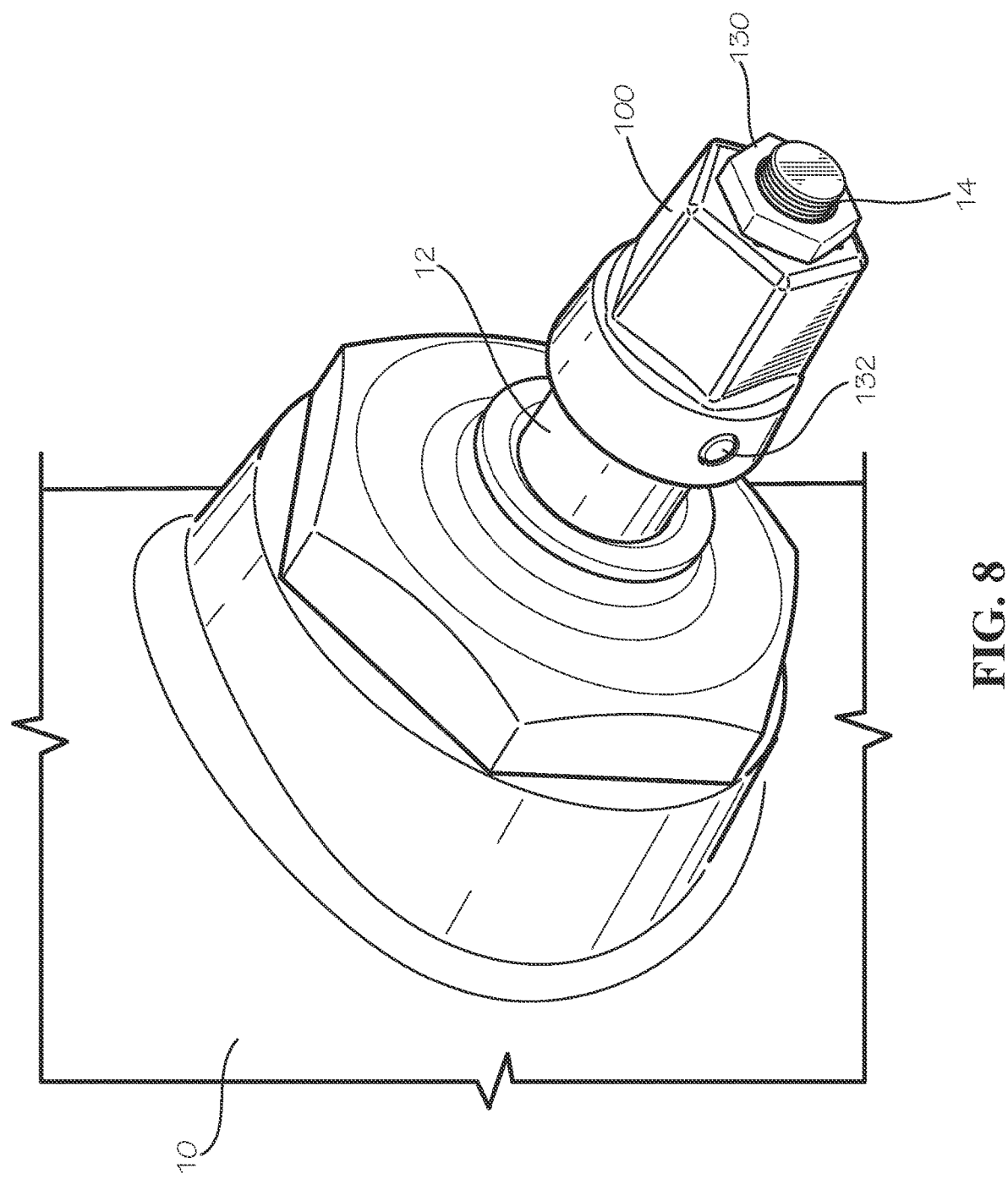
FIG. 8 is a magnified perspective view of a portion of the hydrant of FIG. 7.

FIGS. 4-6 show a hydrant 10 comprising another aspect of tamper-resistant operating nut, the hydrant 10 comprising two operating nuts 100, two tightening nuts 120, and two snap rings 122 (shown in FIG. 5), according to one aspect. The operating stem 12 comprising the threaded distal end 14 can extend from the body of the hydrant 10. As shown in FIG. 6, the operating nut 100 can comprise the first end 102, the opposed second end 104, and the central bore 106 defined in the operating nut 100 extending from the first end 102 to the second end 104. The operating nut 100 can be positioned on the stem 12 of the hydrant 10 such that the first end 102 of the operating nut 100 faces the hydrant 10, a portion of the stem 12 is positioned in the central bore 106, and the threaded distal end 14 of the stem 12 extends beyond the second end 104 of the operating nut 100.

The snap ring 122 can define an internal diameter that is selectively adjustable about and between a relaxed position and an expanded position. In one aspect, in the relaxed position, the snap ring 122 can define a relaxed internal diameter that is less than or equal to an outer diameter of the threaded distal end 14 of the stem 12. In another aspect, in the relaxed position, the snap ring 122 can define a relaxed internal diameter substantially equal to a valley 16 defined between adjacent raised threads 18 of the threaded distal end 14 of the stem 12. In the expanded position, the snap ring 122 can define an expanded internal diameter that is greater than the diameter of threads 18 of the threaded distal end 14 of the stem 12. Tools such as snap ring pliers and the like can be used to expand the internal diameter of the snap ring 122 from the relaxed position to the expanded position. In another aspect, the snap ring 122 can define an outer diameter that is less than a diameter of the central bore 106 of the operating nut 100.

The snap ring 122 can be positioned onto the threaded distal end 14 of the stem 12 and in the central bore 106 of the operating nut 100. In one aspect, the snap ring 122 can be positioned onto the threaded distal end 14 of the stem 12 at a location spaced from the end of the stem 12 a predetermined distance, as illustrated in FIG. 5. For example, the snap ring 122 can be positioned onto the threaded distal end 14 of the stem 12 adjacent to a non-threaded portion of the stem 12 with snap ring pliers. In another aspect, the snap ring 122 can be positioned onto the threaded distal end 14 of the stem 12 at the valley 16 defined between the adjacent raised threads 18 of the threaded distal end 14 of the stem 12. Upon removal of the snap ring pliers, the snap ring 122 can move from the expanded internal diameter towards the relaxed internal diameter so that the internal diameter of the snap ring 122 decreases and the snap ring 122 is securely attached to the stem 12. Because tools such as snap ring pliers and the like are not common tools, unauthorized removal of the snap ring 122 from the stem 12 can be difficult.

In one aspect, the tightening nut 120 can be a conventional nut comprising internal threads defined in the tightening nut 120 and configured to matingly engage the threaded distal end 14 of the stem 12. The tightening nut 120 can then be threaded onto the distal end 14 of the stem 12 and securely attached to the stem 12 with a conventional wrench, socket and the like. In one aspect, the tightening nut 120 can be threaded onto the stem 12 until a proximal end 124 of the tightening nut 120 is adjacent to the second end 104 of the operating nut 100.

In use, the tightening nut 120 can fixedly secure the operating nut 100 in place on the stem 12 of the hydrant 10, and the snap ring 122 can help insure that that operating nut 100 remains in place on the hydrant 10. For example, if an unauthorized user of the hydrant 10 wants to remove the operating nut 100, upon removal of the tightening nut 120 with a conventional wrench, the snap ring 122 can prevent removal of the operating nut 100 without specialized, uncommon tools.

While reference is made to snap rings 122, other compressive rings and fastening devices that require the use of specialized tools to install and remove the rings are also contemplated.

Figure 9:
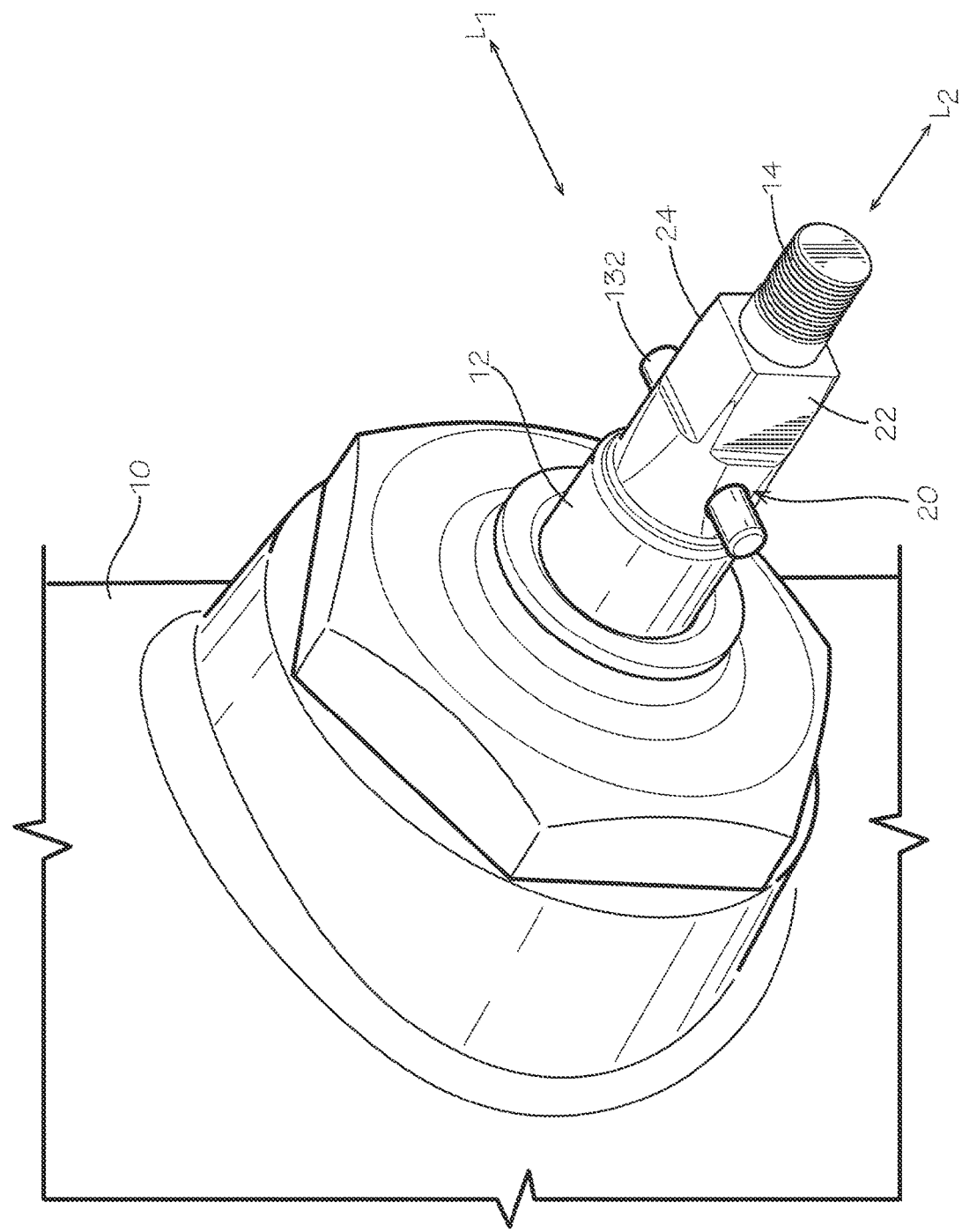
FIG. 9 is a magnified perspective view of a portion of the hydrant of FIG. 7, in which the operating nut is not shown for clarity.
Figure 10:
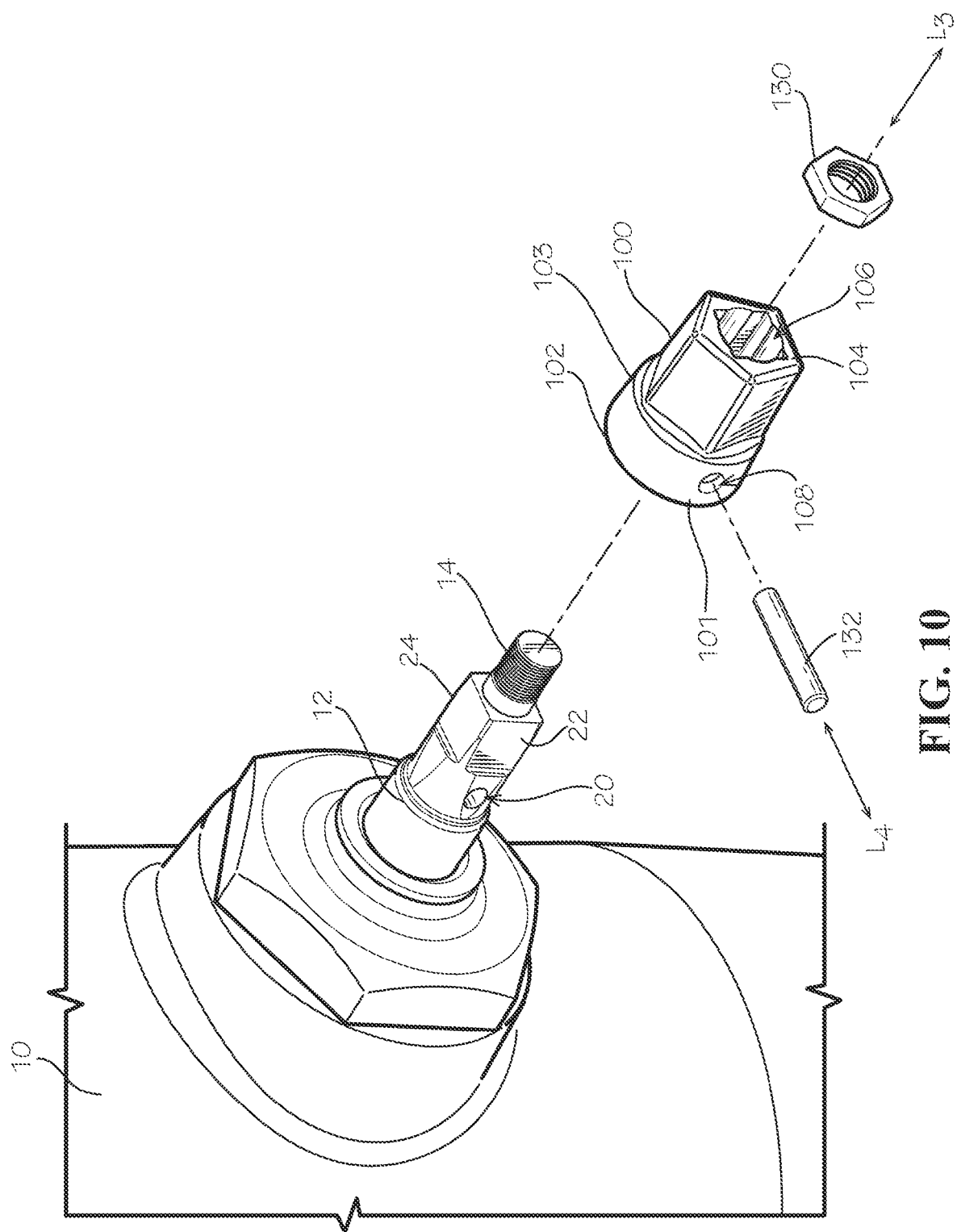
FIG. 10 is an exploded perspective view of the hydrant of FIG. 7.

FIGS. 7-11 show a hydrant 10 comprising another aspect of a tamper-resistant operating nut, the hydrant 10 comprising two operating nuts 100, a tightening nut 130, and a dowel pin 132, according to one aspect. The operating stem 12 comprising the threaded distal end 14 can extend from the body of the hydrant 10. As shown in FIGS. 9 and 10, the operating stem 12 can define an elongate passage 20 defining a passage axis $L_1$ that is substantially perpendicular to a longitudinal stem axis $L_2$ of the stem 12. In one aspect, the passage 20 of the stem 12 can extend from a first side 22 of the stem 12 through to an opposed second side 24 of the stem 12. Alternatively, in other aspects, the elongate passage 20 of the stem 12 can extend from the first side 22 of the stem 12 partially through the stem 12 without extending to the second side 24.

As shown in FIG. 10, the operating nut 100 can comprise the first end 102, the opposed second end 104, and the central bore 106 defined in the operating nut 100 extending from the first end 102 to the second end 104 of the operating nut 100 along a central bore axis $L_3$. In one aspect, the operating nut 100 can define a dowel bore 108 defining a dowel bore axis $L_4$ that is substantially perpendicular to the central bore axis $L_3$ of the operating nut 100. In another aspect, the dowel bore 108 of the operating nut 100 can extend from a first side 101 of the operating nut 100 through to an opposed second side 103 of the operating nut 100. Alternatively, in other aspects, the dowel bore 108 of the operating nut 100 can extend from the first side 101 of the operating nut 100 partially through the operating nut 100 without extending to the second side 103. For example, the dowel bore 108 can extend through the first side 101 of the operating nut and into the central bore 106.

The operating nut 100 can be positioned on the stem 12 of the hydrant 10 such that a portion of the stem 12 is positioned in the central bore 106 and the threaded distal end 14 of the stem 12 extends beyond the second end 104 of the operating nut 100. In one aspect, the operating nut 100 can be positioned on the stem 12 of the hydrant 10 such that the dowel bore 108 of the operating nut 100 is substantially co-axially aligned with the passage 20 of the stem 12. In another aspect, the operating nut 100 can be positioned on the stem 12 of the hydrant 10 such that the central bore axis $L_3$ and the longitudinal stem axis $L_2$ of the stem 12 are substantially parallel.

The dowel pin 132 can be sized and configured to frictionally engage the dowel bore 108 of the operating nut 100 and/or the passage 20 of the stem 12. For example, with the dowel bore 108 of the operating nut 100 substantially co-axially aligned with the passage 20 of the stem 12, the dowel pin 132 can be inserted into the dowel bore 108 of the operating nut 100 and the passage 20 of the stem 12. Friction between the walls of the dowel bore 108 of the operating nut 100 and/or the passage 20 of the stem 12 can hold the dowel pin 132 in place relative to the operating nut 100 and the stem 12. In one aspect, the dowel pin 132 can define a pin length substantially equal to or greater than a width of the operating nut 100. In other aspects, the pin length of the dowel pin 132 can be less than the width of the operating nut 100.

In use, the operating nut 100 can be positioned on the stem 12 of the hydrant 10 such that the first end 102 of the operating nut 100 faces the body of the hydrant 10, a portion of the stem 12 is positioned in the central bore 106 and the threaded distal end 14 of the stem 12 extends beyond the second end 104 of the operating nut 100. The dowel bore 108 of the operating nut 100 can be substantially co-axially aligned with the passage 20 of the stem 12. The dowel pin 132 can be inserted through the dowel bore 108 of the first side 101 of the operating nut 100 and into the passage 20 of the stem 12. In one aspect, if the dowel pin 132 defines a pin length substantially equal to or greater than the width of the operating nut 100, the dowel pin 132 can be inserted through the dowel bore 108 of the first side 101 of the operating nut 100, through the passage 20 of the stem 12, and through the dowel pin bore 108 of the second side 103 of the operating nut. In another aspect, if the dowel pin 132 defines a pin length less than the width of the operating nut 100, the dowel pin 132 can be inserted through the dowel bore 108 of the first side 101 of the operating nut 100 and through at least a portion of the passage 20 of the stem 12.

In one aspect, the tightening nut 130 can be a conventional nut comprising internal threads defined in the tightening nut 130 and configured to matingly engage the threaded distal end 14 of the stem 12. The tightening nut 130 can be threaded onto the distal end 14 of the stem 12 and securely attached to the stem 12 with a conventional wrench, socket, and the like. In one aspect, the tightening nut 130 can be threaded onto the stem 12 until a proximal end of the tightening nut 130 is adjacent to the second end 104 of the operating nut 100.

Because the friction fit between the dowel pin 132 and the dowel bore 108 of the operating nut 100 and/or the passage 20 of the stem 12 can be very tight, removal of the dowel pin 132 from the operating nut 100 can be difficult. In one aspect, if the dowel pin 132 extends through both the first side 101 and the second side 103 of the operating nut 100, the dowel pin 132 can be knocked out of the operating nut 100 with tools such as a hammer and punch and the like. In other aspects, however, if the dowel bore 108 is not defined in the second side 103 of the operating nut 100, removal of the dowel pin 132 can require drilling the dowel pin 132 out, which can be very difficult and/or time consuming.

In use, the dowel pin 132 can fixedly secure the operating nut 100 in place on the stem 12 of the hydrant 10. Rotation of the operating nut 100 in a first direction can open a valve in the hydrant 10 so that water can pass through the hydrant 10. Rotation of the operating nut 100 in a second direction that is opposed to the first direction can close the valve and discontinue the flow of water through the hydrant 10. If an unauthorized user of the hydrant 10 wants to remove the operating nut 100, the dowel pin 132 can prevent removal of the operating nut 100 without difficult and/or time consuming procedures.

While reference is made to dowel pins 132, other pinning devices such as a locking pin and the like are also contemplated within the scope of the disclosure.

Figure 11:
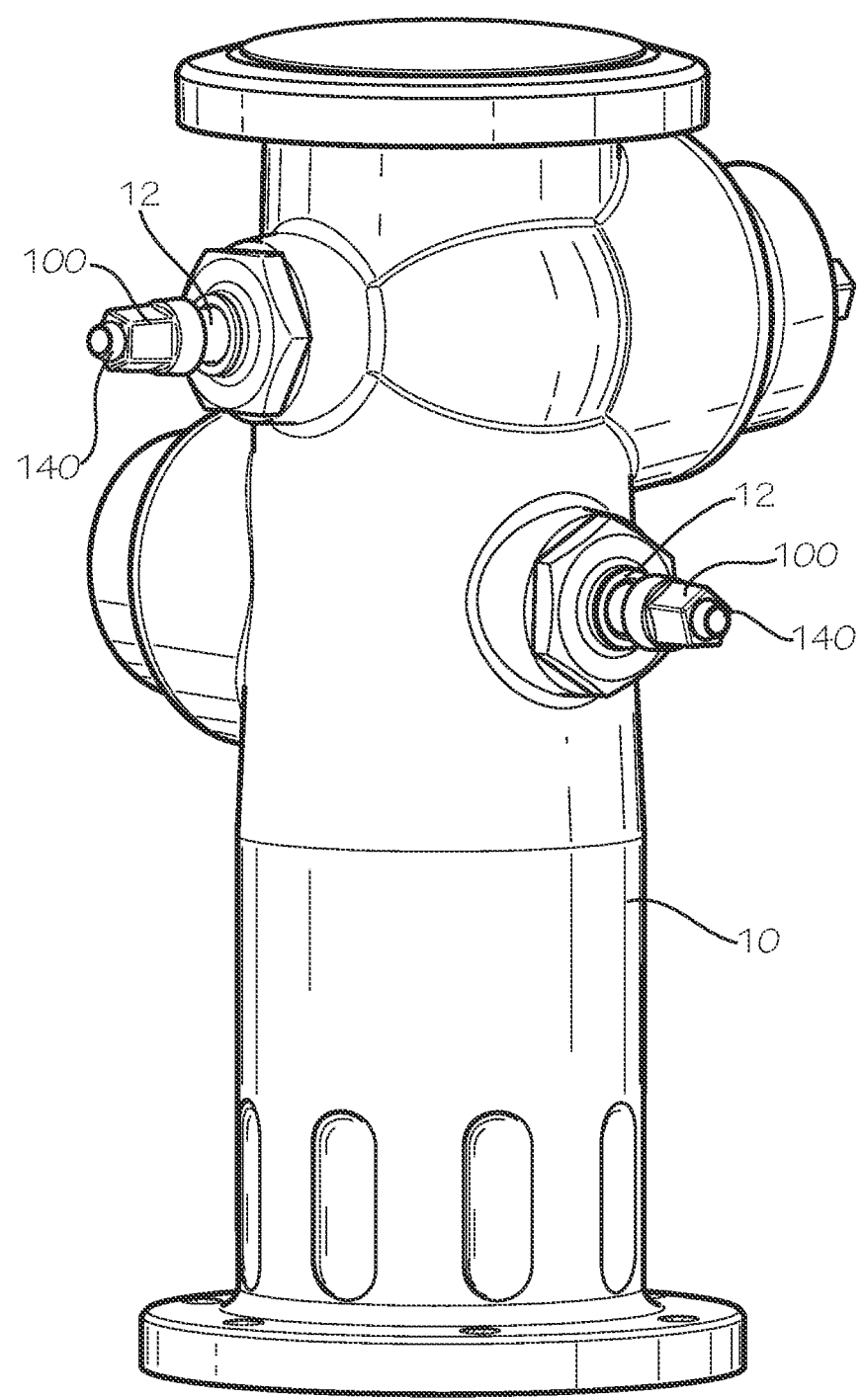
FIG. 11 is a perspective view of a hydrant comprising a tamper-resistant operating nut, in accordance with one aspect of the present disclosure, the hydrant comprising a shear nut.
Figure 12:
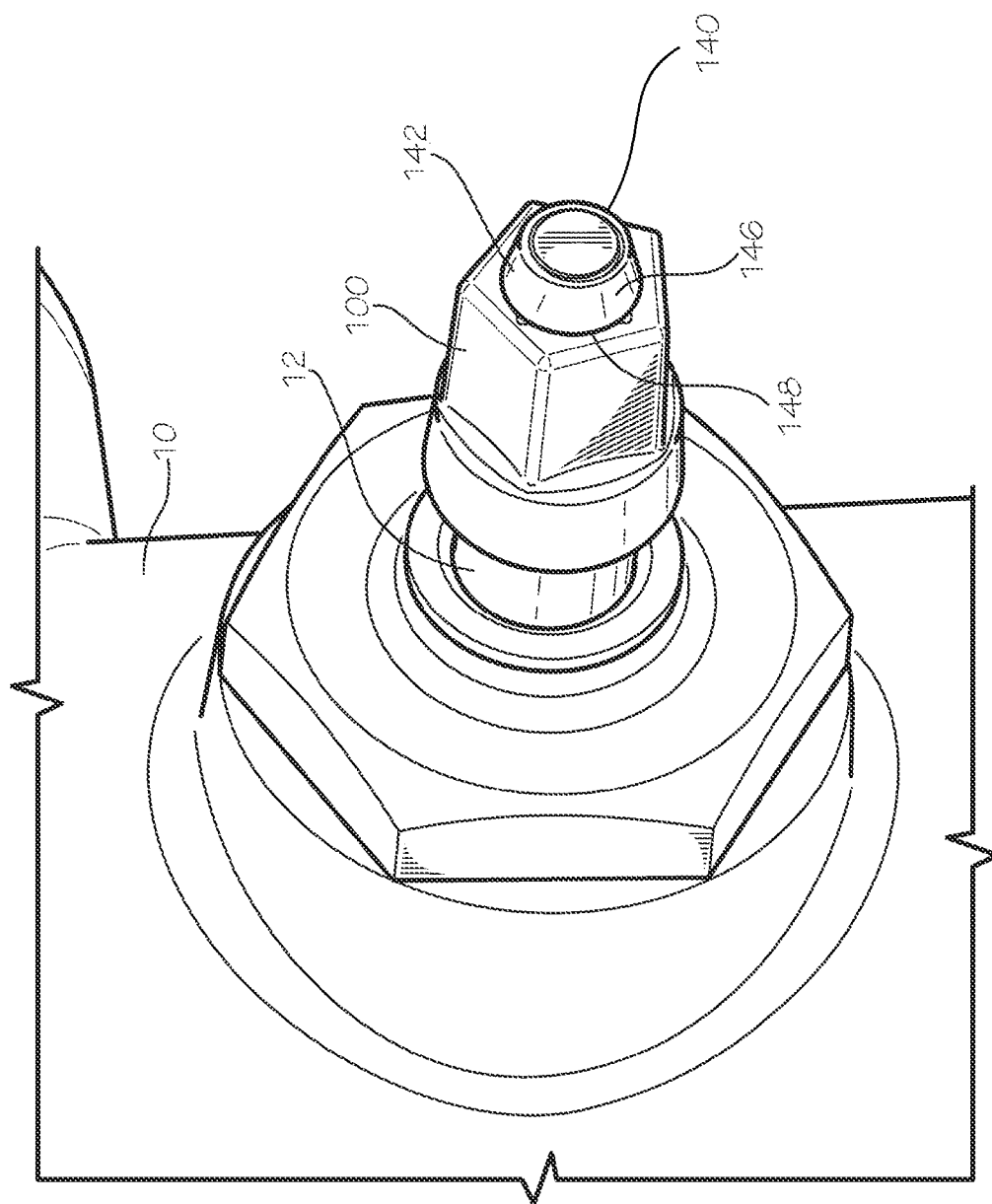
FIG. 12 is a magnified perspective view of a portion of the hydrant of FIG. 11.
Figure 13:
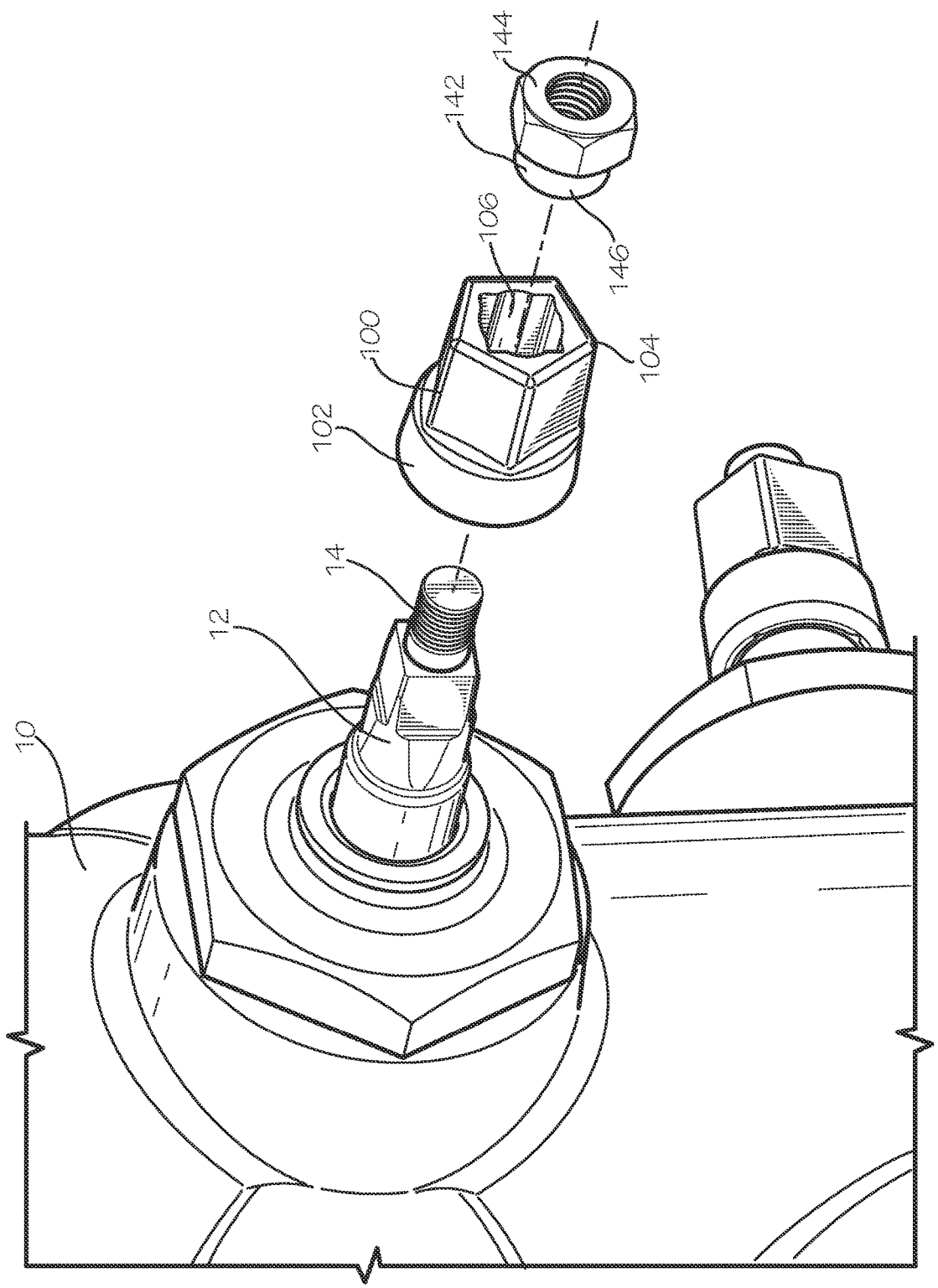
FIG. 13 is an exploded perspective view of the hydrant of FIG. 11.

FIGS. 11-13 show a hydrant 10 comprising another aspect of a tamper-resistant operating nut, the hydrant 10 comprising two operating nuts 100 and two shear nuts 140, according to one aspect. The operating stem 12 comprising the threaded distal end 14 can extend from the body of the hydrant 10. As shown in FIG. 12, the operating nut 100 can comprise the first end 102, the opposed second end 104, and the central bore 106 defined in the operating nut 100 extending from the first end 102 to the second end 104 of the operating nut 100. The operating nut 100 can be positioned on the stem 12 of the hydrant 10 such that the first end 102 of the operating nut 100 faces the hydrant 10, a portion of the stem 12 is positioned in the central bore 106, and the threaded distal end 14 of the stem 12 extends beyond the second end 104 of the operating nut 100.

As shown in FIG. 13, the shear nut 140 can comprise a frustoconical portion 142 coupled to a conventional hex nut 144. The frustoconical portion 142 of the shear nut 140 can define a smooth outer wall and internal threads aligned with the threads of the hex nut 144. In one aspect, the shear nut 140 can be configured so that when positioned on the threaded distal end 14 of the stem 12 and upon application of a predetermined torque to the hex nut 144, the hex nut 144 can shear off or break away from the frustoconical portion 142 so that the hex nut 144 and the frustoconical portion 142 are not coupled together. Thus, while a conventional wrench can be used to rotate the frustoconical portion 142 when the frustoconical portion 142 is coupled to the hex nut 144, when the hex nut 144 shears away from the frustoconical portion 142, the conventional wrench can no longer rotate the frustoconical portion 142 of the shear nut 140.

In use, the shear nut 140 (with the hex nut 144 coupled to the frustoconical portion 142) can be threaded onto the distal end 14 of the stem 12 with the frustoconical portion 142 of the shear nut 140 positioned closer to the hydrant 10 than the hex nut 144. The hex nut 144 can be tightened with a convention wrench and upon reaching the predetermined torque, the hex nut 144 can shear off of leaving the frustoconical portion 142 securely attached to the stem 12. Because the frustoconical portion 142 defines a smooth outer wall 146, tools such as wrenches and the like cannot be used to remove the frustoconical portion 142. Instead, the frustoconical portion 142 must be cut off for removal from the stem 12, which can be difficult. In one aspect, the shear nut 140 can be threaded onto the stem 12 until a proximal end 148 of the shear nut 140 is adjacent to the second end 104 of the operating nut 100.

In use, the shear nut 140 can fixedly secure the operating nut 100 in place on the hydrant 10. Rotation of the operating nut 100 in a first direction can open a valve in the hydrant 10 so that water can pass through the hydrant 10. Rotation of the operating nut 100 in a second direction that is opposed to the first direction can close the valve and discontinue the flow of water through the hydrant 10. If an unauthorized user of the hydrant 10 wants to remove the operating nut 100, the frustoconical portion 142 of the shear nut 140 can prevent removal of the operating nut 100 without difficult and/or time consuming procedures.

While reference is made to shear nuts 140, other fastening devices that must be cut for removal, such as one way screws and the like are also contemplated.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A hydrant comprising:
    an operating stem comprising a threaded distal end extending from the hydrant;
    an operating nut comprising a first end facing the hydrant, an opposed second end, and a central bore defined in the operating nut and extending from the first end to the second end, the operating nut positioned on the operating stem such that a portion of the operating stem is positioned in the central bore and the threaded distal end of the operating stem extends beyond the second end of the operating nut; and
    a shear nut comprising a breakaway portion coupled to a nut portion, the shear nut rotatably secured to the threaded distal end of the operating stem.

2. The hydrant of claim 1, wherein each of the breakaway portion and the nut portion comprise internal threads configured to matingly engage the threaded distal end of the operating stem.

3. The hydrant of claim 2, wherein the nut portion is configured to be rotatably secured to the threaded distal end of the operating stem such that, at a predetermined torque, the nut portion separates from the breakaway portion.

4. The hydrant of claim 3, wherein the breakaway portion defines a frustoconical breakaway portion.

5. The hydrant of claim 4, wherein the frustoconical breakaway portion defines a smooth outer wall.

6. The hydrant of claim 4, wherein the nut portion is a hex nut portion defining six substantially planar nut sidewalls.

7. The hydrant of claim 4, wherein the shear nut is configured to be rotated relative to the threaded distal end of the operating stem until a proximal end of the frustoconical breakaway portion is adjacent to the second end of the operating nut.

8. The hydrant of claim 7, wherein a diameter of the breakaway portion at the proximal end is greater than a diameter of the breakaway portion at a distal end thereof.

9. The hydrant of claim 8, wherein:
    the operating stem defines a first planar stem face;
    the central bore of the operating nut defines a first planar nut face; and
    the first planar stem face confronts the first planar nut face within the central bore to prevent rotation of the operating nut on the operating stem.

10. The hydrant of claim 8, wherein the operating stem defines a shoulder, the second end of the operating nut abutting the shoulder to prevent axial movement of the operating nut towards the hydrant, the operating nut sandwiched between the shoulder and the frustoconical breakaway portion.

11. The hydrant of claim 10, wherein the shoulder is an annular shoulder extending radially inward relative to a stem axis of the operating stem.

12. The hydrant of claim 11, wherein the operating nut further defines a plurality of planar outer faces.

13. The hydrant of claim 12, wherein the operating nut further defines a substantially cylindrical collar formed at the first end of the operating nut, the substantially cylindrical collar abutting the annular shoulder.

14. A method of preventing tampering with a hydrant, the method comprising:
   inserting an operating stem of the hydrant through a central bore of an operating nut to mount the operating nut on the operating stem;
   rotatably threading a shear nut onto a threaded distal end of the operating stem, the shear nut comprising a breakaway portion and a nut portion; and
   breaking the nut portion away from the breakaway portion to remove the nut portion from the operating stem.

15. The method of claim 14, wherein breaking the nut portion away from the breakaway portion comprises tightening the shear nut on the operating stem and abutting a proximal end of the breakaway portion against a second end of the operating nut.

16. The method of claim 15, wherein the breakaway portion defines a frustoconical breakaway portion, and wherein a diameter of the frustoconical breakaway portion is greater at the proximal end thereof than at a distal end of the frustoconical breakaway portion.

17. The method of claim 16, wherein the nut portion is a hex nut portion defining six substantially planar nut sidewalls.

18. The method of claim 15, wherein inserting the operating stem of the hydrant through the central bore of the operating nut further comprises abutting a first end of the operating nut against a shoulder of the operating stem.

19. The method of claim 18, wherein the operating nut further defines a plurality of planar outer faces and a substantially cylindrical collar, the substantially cylindrical collar formed at the first end of the operating nut, and wherein the shoulder is a substantially annular shoulder, the substantially cylindrical collar abutting the substantially annular shoulder.

20. The method of claim 14, further comprising confronting a planar stem face of the operating stem with a planar nut face defined by the central bore of the operating nut to prevent rotation of the operating nut on the operating stem.

* * * * *